United States Patent
Andreas

(10) Patent No.: US 7,418,487 B2
(45) Date of Patent: Aug. 26, 2008

(54) APPARATUS AND THE METHOD FOR INTEGRATING NICS WITH RDMA CAPABILITY BUT NO HARDWARE MEMORY PROTECTION IN A SYSTEM WITHOUT DEDICATED MONITORING PROCESSES

(75) Inventor: Savva Andreas, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 10/721,506

(22) Filed: Nov. 26, 2003

(65) Prior Publication Data
US 2004/0111498 A1    Jun. 10, 2004

(30) Foreign Application Priority Data
Dec. 10, 2002   (JP)   ............... 2002-357449

(51) Int. Cl.
  G06F 15/177   (2006.01)
  G06F 15/167   (2006.01)
  G06F 13/28    (2006.01)

(52) U.S. Cl. ............... 709/220; 709/212; 709/213; 710/22

(58) Field of Classification Search ............... None
See application file for complete search history.

(56) References Cited

U.S. PATENT DOCUMENTS

| | | | |
|---|---|---|---|
| 6,119,244 A * | 9/2000 | Schoenthal et al. | 714/4 |
| 6,675,200 B1 * | 1/2004 | Cheriton et al. | 709/212 |
| 6,804,673 B2 * | 10/2004 | Sugahara et al. | 707/10 |
| 7,103,650 B1 * | 9/2006 | Vetrivelkumaran et al. | 709/221 |
| 7,171,452 B1 * | 1/2007 | Gole | 709/212 |
| 2004/0024833 A1 * | 2/2004 | Siddabathuni | 709/212 |
| 2004/0030770 A1 * | 2/2004 | Pandya | 709/223 |
| 2004/0049600 A1 * | 3/2004 | Boyd et al. | 709/250 |
| 2004/0073622 A1 * | 4/2004 | McDaniel et al. | 709/212 |
| 2004/0093389 A1 * | 5/2004 | Mohamed et al. | 709/212 |
| 2004/0225719 A1 * | 11/2004 | Kisley et al. | 709/212 |
| 2004/0225720 A1 * | 11/2004 | Pinkerton | 709/212 |
| 2005/0015460 A1 * | 1/2005 | Gole et al. | 709/213 |
| 2006/0075057 A1 * | 4/2006 | Gildea et al. | 709/212 |
| 2006/0259570 A1 * | 11/2006 | Feng et al. | 709/213 |

* cited by examiner

Primary Examiner—John B. Walsh
(74) Attorney, Agent, or Firm—Staas & Halsey LLP

(57) ABSTRACT

In a network having a plurality of hosts, when a host boots, the driver of the host sends a BOOTING message indicating that the host boots to all other hosts. When a host other than the booting host receives the BOOTING message, the driver disables RDMA access to the booting host. The drivers of the hosts other than the booting host respond with ACK or BOOTING messages. The network may generate a hardware NACK in certain cases that, for example, if there is no NIC attached, or a NIC is attached but powered down. After the booting host receives the response from all hosts, the driver of the booting host sends an $RDMA_{13}$ READY message to all the other hosts. Then RDMA access to the self host is enabled.

11 Claims, 8 Drawing Sheets

TPT on Node 0

| TPT Entry 0 |
| TPT Entry 1 |
| NODE 0 region (local) |
| TPT Entry n-1 |
| |
| Remote Node 1 portion |
| |
| Remote Node 2 portion |
| ... |
| Remote Node N-1 portion |

(a)

Entry Format

| Entry # | Logical Address | Physical Address | Length | Protection | Attributes |

(b)

F I G. 3

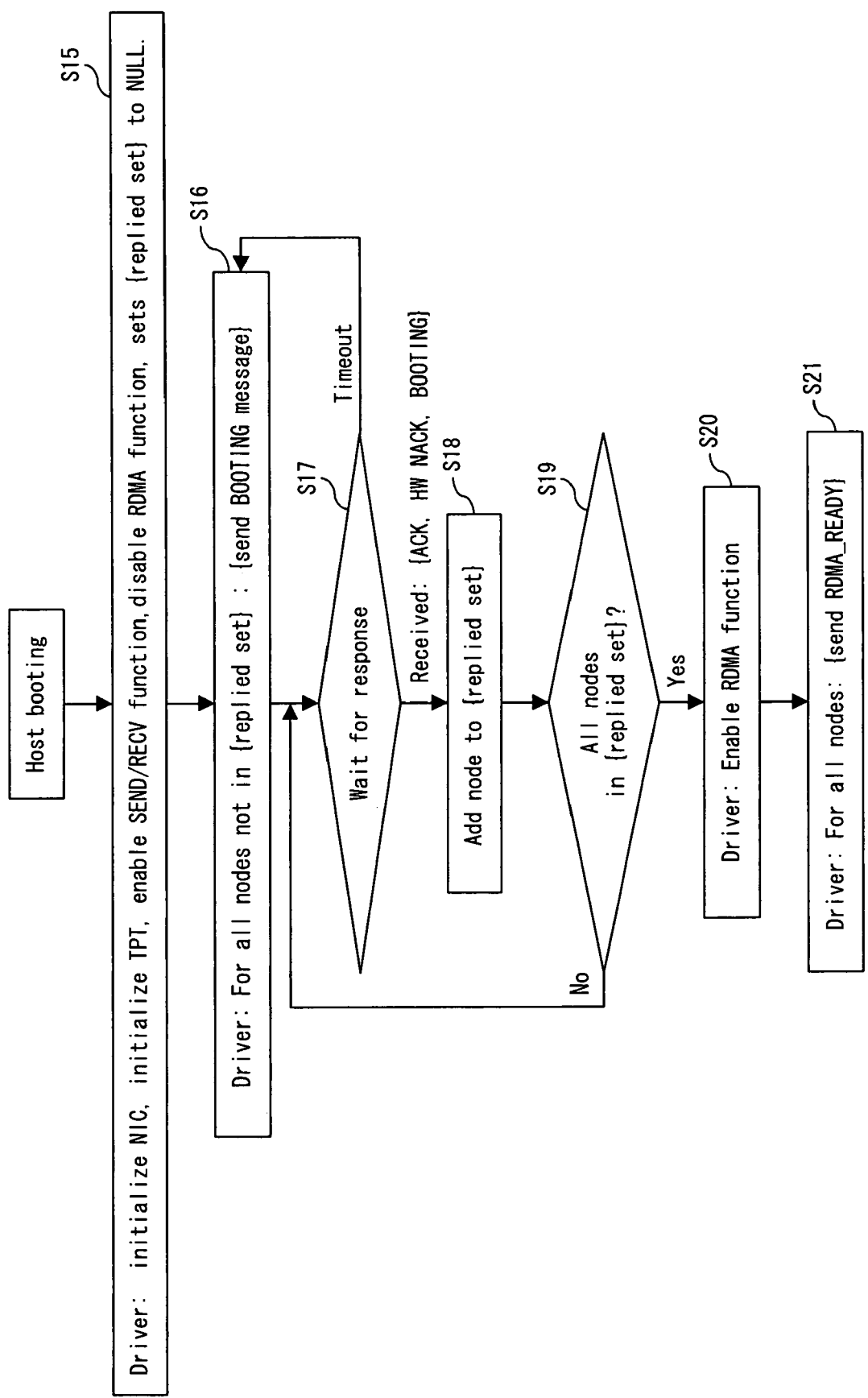
F I G. 7

APPARATUS AND THE METHOD FOR INTEGRATING NICS WITH RDMA CAPABILITY BUT NO HARDWARE MEMORY PROTECTION IN A SYSTEM WITHOUT DEDICATED MONITORING PROCESSES

BACKGROUND OF THE INVENTION

1. Field of the Invention

The present invention relates to an apparatus and a method for integrating or re-integrating host machines which have RDMA functions into a network.

2. Description of the Related Arts

Remote DMA (RDMA: Remote Direct Memory Access) is becoming an important requirement for Network Interface Cards (NICs), especially with recent proposals to add RDMA extensions to popular APIs. NICs supporting RDMA are required to support memory protection, e.g., a translation and protection table (TPT), to ensure that RDMA accesses to local memory are properly validated. Implementing such a table increases the hardware cost and might affect performance, especially for NICs connected to a peripheral bus (e.g., PCI: Peripheral Component Interconnect). An alternative to a hardware based TPT is to make the NIC drivers responsible for validating RDMA accesses to other NICs. In this case, the whole system must cooperate to ensure that RDMA accesses do not occur in such a way as to crash a host.

Solutions to this problem may take the form of a system-wide protection table, a copy of which is held by each driver running on a host. Drivers update the local portion of the table and push changes to remote drivers. As long as no host reboots there is no problem. When a host, e.g., HOST_A, reboots, however, the remaining hosts in the systems do not (and cannot) become aware of this event immediately. If HOST_A enables RDMA accesses immediately after reboot, RDMA operations initiated from a remote host based on old information (prior to HOST_A rebooting) in the protection table can crash HOST_A.

For example, when a host (a node in a network) is rebooted, the host's internal RDMA settings, i.e., registered memory regions, are cleared and initialized. But if other hosts' RDMA settings have not been updated, other hosts may try to access the memory of the recently rebooted host using RDMA. At that time, because memory allocation in the host is initialized after rebooting and the initialization of the memory allocation of the rebooted host is not reflected in the other hosts' settings, the other hosts' access to the memory of the rebooted host, directed to an address which is determined by the old settings may overwrite important information for operation of the rebooted host, which could cause a crash of the rebooted host.

It is therefore essential to ensure that a rebooted host is recognized as such by the other hosts and that any information in the system's protection table relating to the rebooted host be invalidated before a rebooted host is fully re-integrated in the system.

Typical solutions to this problem might take the form of a user level process (like a daemon process in Unix (™)) on each node that, perhaps in cooperation with a heartbeat user level process, informs drivers of changes in the status of remote hosts. For example, a system may have a NIC control process and a heartbeat process on each host. The NIC control process is responsible to initialize the NIC and inform the NIC driver of changes, e.g., host reboots, in the system. Each heartbeat process keeps track of the state of other hosts by exchanging messages with heartbeat processes. Suppose that a host, HOST_A, fails then there are no heartbeat messages sent. After a predefined period other heartbeat processes determine that HOST_A has failed. Then each heartbeat process informs its NIC control process which then informs the driver to block all access to HOST_A. Once HOST_A recovers, its heartbeat process starts sending messages again. Other heartbeat processes receive the message and then inform their NIC control process which in turn informs the driver to re-enable access to HOST_A. There are some problems with this approach however. For example, it may take some time before a NIC is initialized as its initialization depends on a user level process, the NIC control process. If the host is heavily loaded this process may not be scheduled to run in a timely manner (slow system response). During this period the NIC is unavailable. Also it is possible that either the NIC control or heartbeat process fail. Failure of the NIC control process compromises the host's response to system events, e.g., access to a rebooted host may not be re-enabled for a very long time. Failure of the heartbeat process may be misinterpreted as a host crash, hence affect overall system performance. In other words by using user level processes the overall reliability of the system may be reduced.

Other problems may result from the user level process potentially using a different communication path for its integration protocol from that used by RDMA requests and hence not being able to ensure that there are no RDMA accesses in transit before the NIC's RDMA functionality is enabled.

Suppose that a node is rebooted. The driver of that node loses all information about its previous state. In particular it loses all previously registered memory regions and all information about memory regions registered on the other nodes. Remote nodes may or may not be aware that the node has rebooted however. The problem of re-integrating the NIC on the rebooted host in a system where some drivers are aware that the host has rebooted while others are not, needs to be solved. The solution must be safe in the sense that it must ensure that there are no RDMA operations in transit with the NIC as a target. If such RDMA operations exist they were initiated before the host was rebooted, are based on old information and will likely crash the host. At the end of re-integration the NIC driver must have a current copy of the system's protection table and all other hosts that are part of the system must be aware that the NIC is a functioning part of the system. Solving this problem with user level monitoring processes delays the entire NIC initialization until a safe time. In order for the user level processes to communicate each host would have to be fitted with other NICs, without RDMA functionality, hence increasing overall hardware cost.

SUMMARY OF THE INVENTION

The object of the present invention is to provide an apparatus and a method for integrating a host which has an RDMA capable NIC safely into the network without relying on user level processes for coordinating the NIC's initialization.

An apparatus according to the present invention is an apparatus in a host in a network comprising a plurality of hosts, the host and the plurality of hosts having an RDMA function, comprising: a unit sending a first message indicating the host is booted, to all of the plurality of hosts in the network when the host in the network is booted; a unit disabling any RDMA access from the plurality of hosts to the host; a unit responding to the first message by sending a second message to the host; and a unit sending a third message indicating the host is ready to accept RDMA accesses from the plurality of hosts, to all of the plurality of hosts after the second messages from all of the plurality of hosts is received and the RDMA function is enabled.

According to the present invention, each time the host in the network is booted the host notifies all hosts in the network. Therefore all the hosts can recognize which host has booted so that each host can clear and update the information used for RDMA access to the host correctly. As a result, the host which was booted is safely integrated or re-integrated into the network, causing no crash. Integration and re-integration of the host which was booted or re-booted into the network is done in the same manner.

Part of the originality of this approach lies in separating the initialization of the SEND/RECEIVE and RDMA functionality. The SEND/RECEIVE initialization is carried out so as to allow the NIC itself to be used for the protocol, thereby reducing the overall hardware cost—there is no requirement for an additional NIC without RDMA functionality to carry out the protocol. In addition, because the NIC itself is used to carry out this protocol the guarantee that there are no pending RDMA accesses in the system once the protocol terminates can be achieved more simply than if user processes were used. Further it is possible to start using the NIC for normal communication via SEND/RECEIVE while this protocol is still in progress. Also by reducing the reliance on user processes the number of components in the system is reduced, hence overall reliability is improved. Putting this functionality in the kernel does increase driver development cost but the extra cost is fairly small due to the protocol's simplicity.

BRIEF DESCRIPTION OF THE DRAWINGS

FIG. 3 shows the configuration of the translation and protection table.

FIG. 7 shows the flowchart of the host booting according to the embodiment of the present invention.

DESCRIPTION OF THE PREFERRED EMBODIMENTS

Here is presented an approach that does not require user level processes to ensure that a rebooted host's NICs are safely re-integrated into the system and their RDMA function is enabled. The approach relies only on cooperation between the NIC drivers in the system. Implementing this functionality in the driver increases the development cost but has the benefit of faster response. (The drivers can take advantage of interrupt context to reply to incoming protocol messages from other nodes.) In addition, the driver can ensure that there are no old RDMA accesses in transit before enabling its RDMA functionality. The logic required is probably simpler than that required by a user level process, therefore reliability may also be improved.

System Configuration

Figure 1:
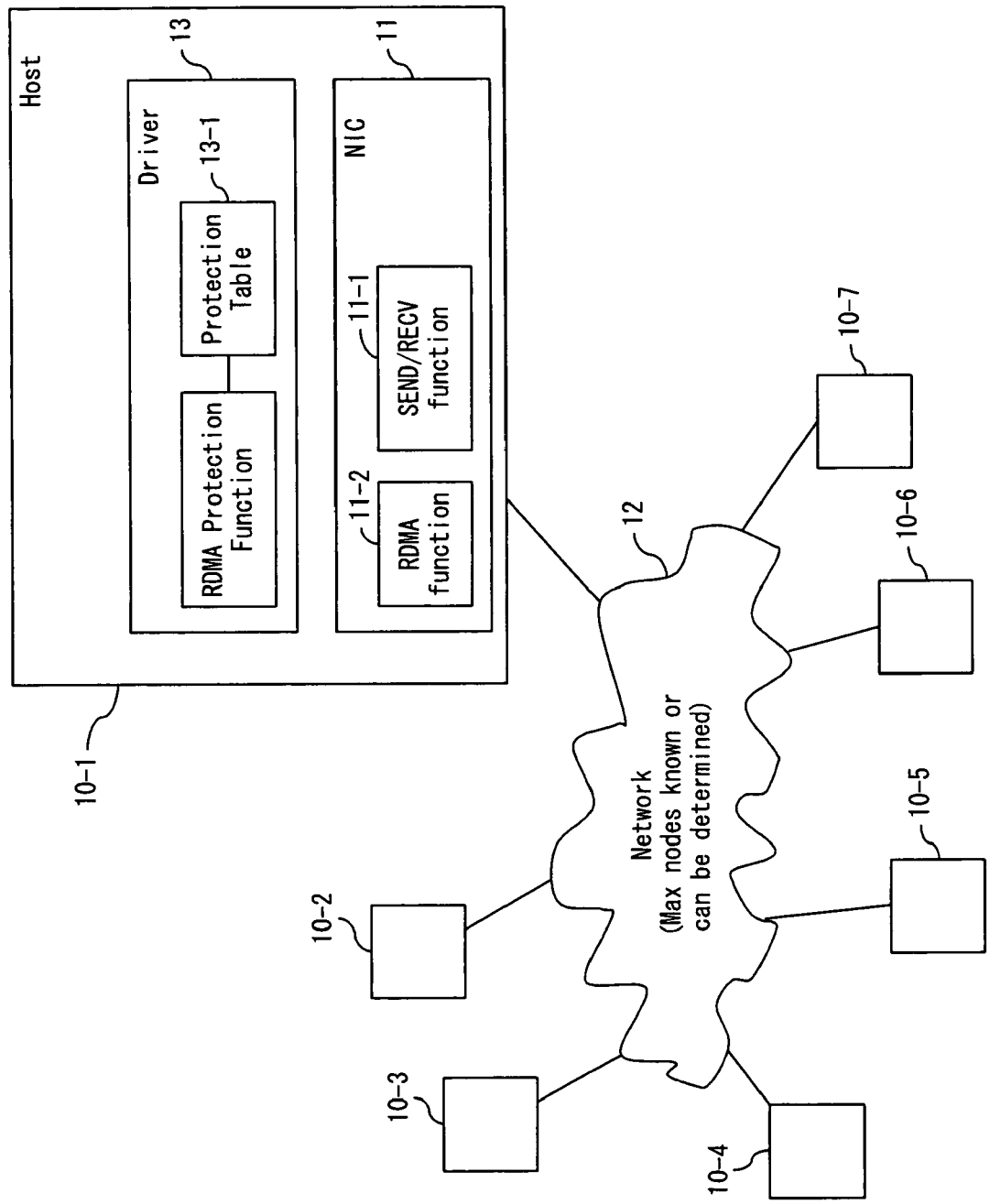
FIG. 1 shows the system configuration on which the embodiment of the present invention is based.

FIG. 1 shows the system configuration on which the embodiment of the present invention is based.

The system is made up of a number of hosts 10-1 through 10-7. Each host 10-1 through 10-7 has one or more NIC 11. The NICs 11 are connected via a network 12. The NICs 11 have both SEND/RECEIVE 11-1 and RDMA 11-2 functionality separately. For example, it is possible to enable SEND/RECEIVE functionality 11-1 while at the same time disabling RDMA functionality 11-2.

NICs 11 do not have a dedicated hardware address translation and protection table (TPT). Instead drivers 13 cooperatively maintain a software system-wide protection table 13-1. The table 13-1 is made of two parts, a local part and a remote part. Entries are added to the local portion of the table as a result of local user applications registering memory with the driver 13. User processes can enable or disable RDMA access to the memory they register. The driver 13 propagates changes to its local portion of the table 13-1 to the equivalent remote portion of other nodes' table 13-1. As long as no host reboots, all drivers 13 have the same information in their protection tables 13-1.

Each driver's protection table 13-1 contains information for all NICs 11 in the system. When a local process issues an RDMA operation, the driver 13 can check its copy of the protection table 13-1 and decide whether the remote access is allowed or not. (Alternative formulations of the protection table are possible. For example, drivers may validate each RDMA transaction via a separate protocol. In that case, each driver has a table which registers only local addresses and when remote access is required, before the request for remote access is issued, a message which establishes a protocol is communicated between the hosts using the table which has only local addresses. The problem of using old protection information still exists however. The approach presented later on is still applicable.)

The maximum number of NICs 11 in the system is known by all hosts 10-1 through 10-7 or can be determined. This maximum number reflects the total possible number of NICs 11 that can be connected to the network 12, not the currently connected NICs 11. A message or RDMA operation results in delivery of data unless the NIC 11 is not properly initialized or not connected to the network 12. In the latter case there is a hardware generated negative acknowledgment (NACK) that is visible by the driver 13 that sent the message.

When a driver 11 detects a NACK it forbids access to the remote NIC 11 until the NIC 11 is re-integrated into the system.

Finally RDMA and SEND operations with the same source and destination take the same path. The network 12 does not allow such operations to overtake each other.

Figure 2:
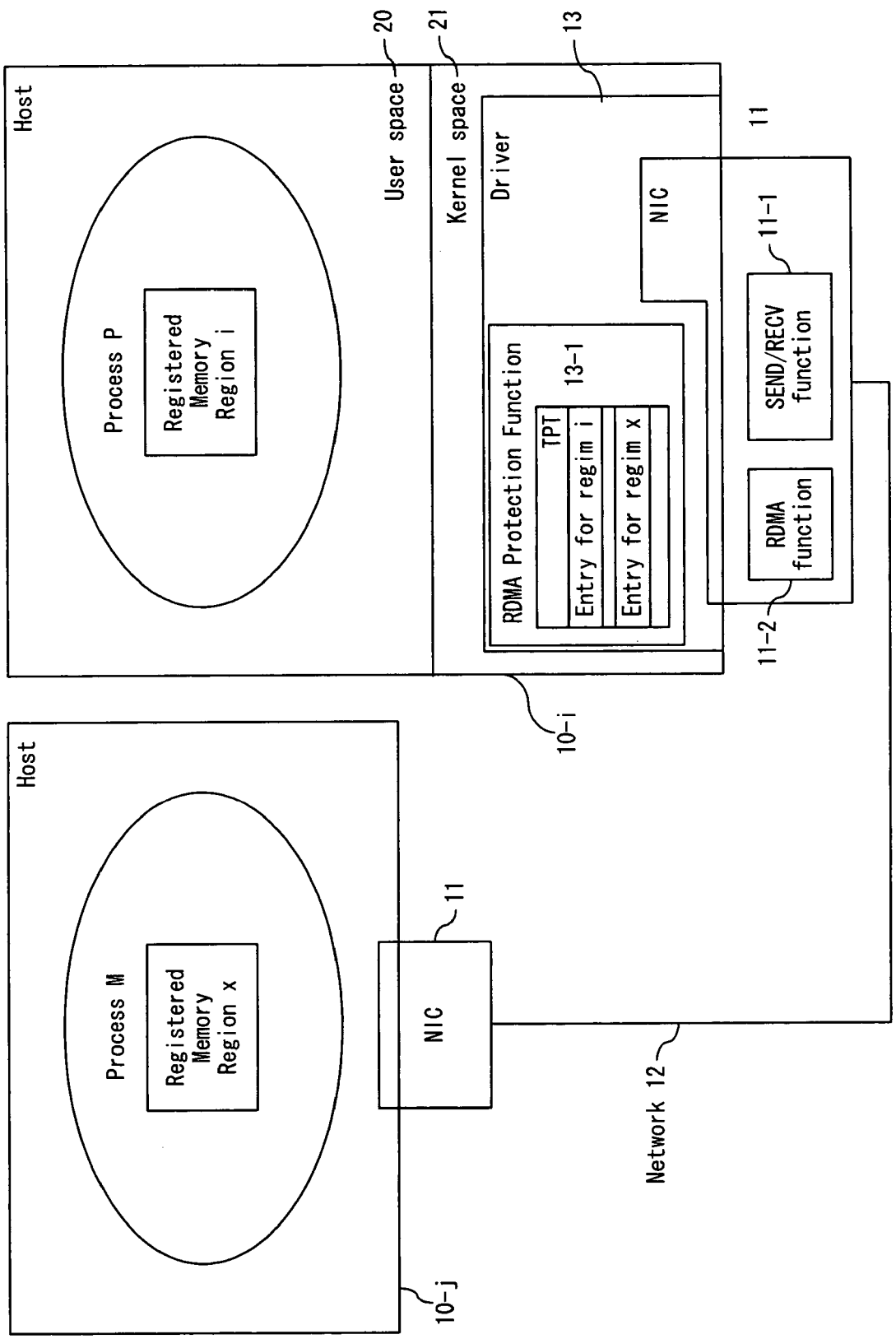
FIG. 2 shows the configuration of the hosts.

FIG. 2 shows the configuration of the hosts.

The hosts 10-i and 10-j are connected by the network 12 through NIC 11. The hosts 10-i and 10-j have a user space and a kernel space. A process P resides in the user space. The driver resides in the kernel space. A NIC is a part of a hardware of the host 10-i and 10-j. Each NIC 11 has SEND/RECEIVE function 11-1 and RDMA function 11-2 with an interface with the network 12 and the driver 13.

When the process P is started, the process P registers the memory region i which is used by the process P itself in the translation and protection table (TPT) 13-1 in the RDMA protection function of the driver 13. Then the TPT 13-1 has an entry for region i which is assigned to the process P. Similarly, on the host 10-j, the process M registers the memory region X to the driver (not shown). This registration is reflected in the TPT 13-1 of the host 10-i. Then, the TPT of the host 10-i has an entry of region X for the process M.

When the process P needs to access process M, the process P issues the request for access by referring to the entry of region X in TPT 13-1 and then the access is achieved. When the process M has crashed or the host 10-j has crashed, the entry of region X of TPT 13-1 is deleted from TPT 13-1 to indicate that process M of the host 10-j is not available.

FIG. 3 shows the configuration of the translation and protection table.

In FIG. 3, it is assumed that there are N nodes which are numbered from 0 to N−1 in the network.

The TPT has a local portion and a remote portion as described above. On the node 0, in the local portion of its TPT, the memory region for the self node 0 is registered. In the remote portion, the memory regions for node 1 through node N−1 are registered. The entry format of the TPT is shown in the part (b) of FIG. 3. Each entry of TPT has items of logical address, physical address, length, and protection attributes. A user process in the user space issues a request for access using a logical address. This logical address is translated into a physical address by referring to the TPT and a message is sent to the destination using the physical address. The item of length indicates the length of the region, the address of which is specified by the item of physical address, in bytes, for example. The item of protection attributes is to specify the type of memory protection (read only or write only, etc.) of the region which is specified by the physical address.

Figure 4:
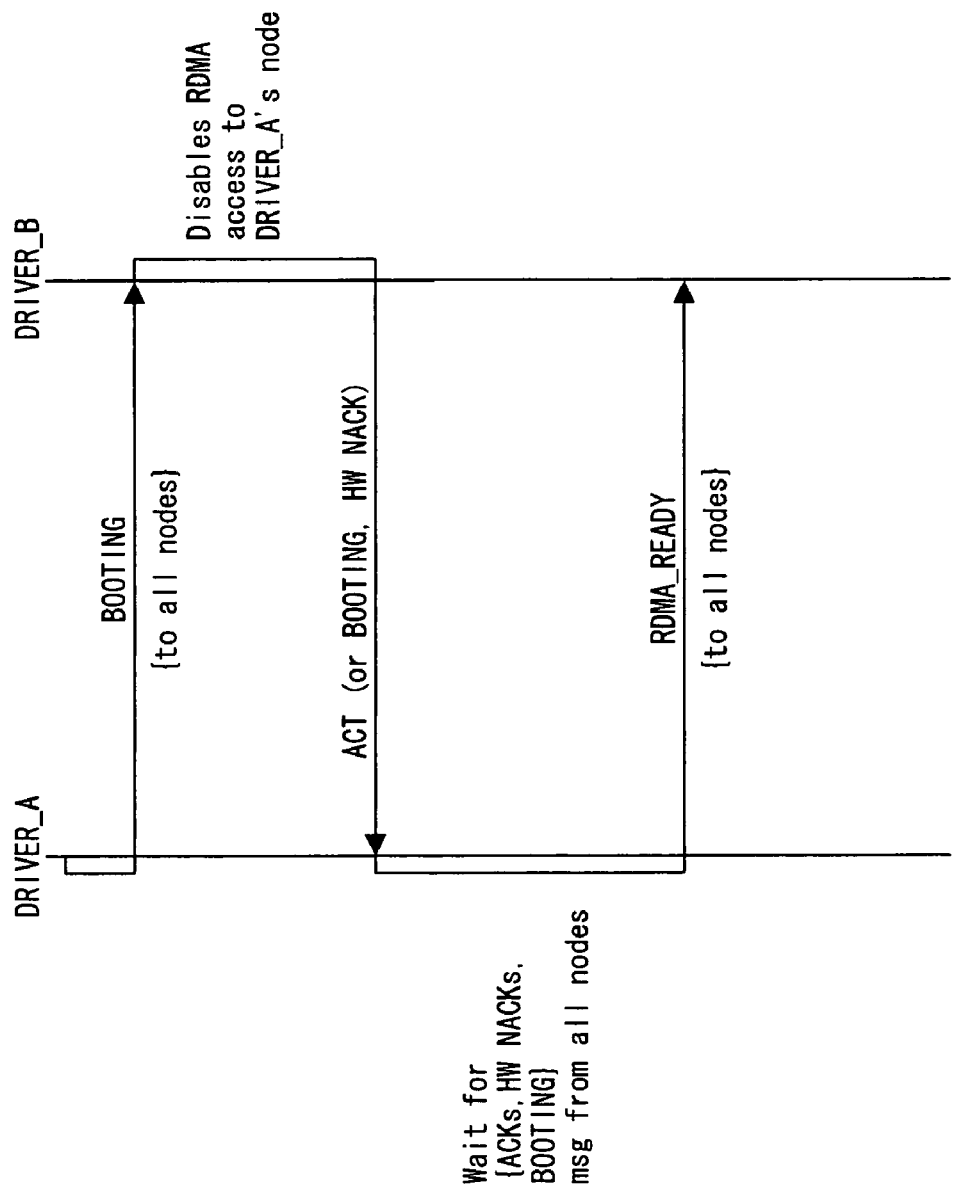
FIG. 4 shows the sequence of message exchanges according to the embodiment of the present invention.

FIG. 4 shows the sequence of message exchanges according to the embodiment of the present invention.

When a host is booting the driver (DRIVER_A), as part of its initialization, enables the SEND/RECEIVE mechanism and disables the RDMA mechanism. The SEND/RECEIVE mechanism is enabled so that the NIC driver can communicate with remote nodes. The RDMA mechanism is disabled so that any incoming (old) RDMA operations will be rejected.

DRIVER_A then broadcasts (or unicasts) a message (BOOTING) that it is booting up to the entire system. It waits to get messages from other NIC drivers that they have recognized its existence. It keeps track of responses in such a way that each host's response is only counted once.

A NIC driver (DRIVER_B) receiving a BOOTING message from DRIVER_A clears DRIVER_A's portion of the translation and protection table held locally. Clearing DRIVER_A's portion of the table has the effect of disabling RDMA accesses to DRIVER_A's NIC. It also disables sending updates to DRIVER_A's translation and protection table. (It is possible that DRIVER_B had earlier recognized that DRIVER_A's NIC was not functioning and had already disabled access to it. Whether access had already been disabled or not does not matter at this point.) The next step is for DRIVER_B to ensure that all posted operations, SEND or RDMA to its NIC are executed. Only then does DRIVER_B reply with an acknowledgment message (ACK).

Since DRIVER_A sent a BOOTING message to DRIVER_B and DRIVER_B replied with an ACK message it is guaranteed that there are no pending or in transit RDMA operations between DRIVER_A and DRIVER_B. (No overtaking and same path assumptions.) In other words, DRIVER_A's NIC is safe from old RDMA operations. Note that if DRIVER_B had not made sure that all posted operations were executed before sending its ACK this guarantee would not hold. It would be possible that the ACK is sent before a previously posted RDMA operation. In particular this. is true for NICs that have multiple queues to handle posted operations.

If a remote NIC is not connected or is not operational then hardware generated (HW) NACKS will be received instead of driver ACKs. The driver therefore can account for all nodes in the system and knows which NICs are part of the system and which are not. Only when all NICs are accounted for does DRIVER_A enable its RDMA functionality. It then sends a message (RDMA_READY) to all known NICs that it is ready for RDMA access.

A NIC driver (DRIVER_B) receiving a RDMA_READY message enables RDMA access to that NIC. In other words it will start sending translation and protection table updates to DRIVER_A's system protection table. It then updates the portion of DRIVER_A's protection table that refers to DRIVER_B's NIC. When all remote NIC drivers have updated their portion of DRIVER_A's table DRIVER_A has been fully re-integrated into the system.

Since a host's state might change at any time it is possible that a BOOTING message is received by a NIC driver (DRIVER_C) but before the driver can reply its host crashes. In this case DRIVER_A will not be able to account for DRIVER_C's NIC. Therefore DRIVER_A after an appropriate timeout period, re-sends BOOTING messages to the NICs it could not account for. This process is repeated until all NICs are accounted for. As an alternative it is also possible for DRIVER_A to shortcut this process if it receives a BOOTING message instead of an ACK message from DRIVER_C.

A new host can be added to the system in the same way as a rebooting host.

Figure 5:
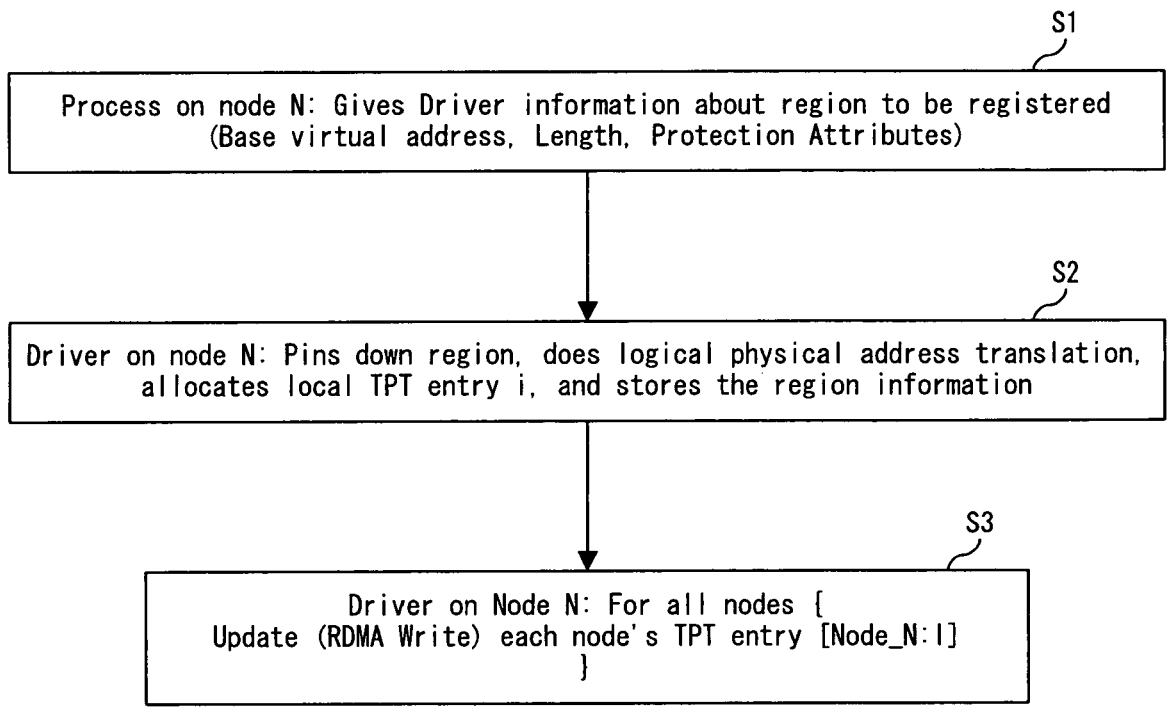
FIG. 5 shows the flowchart by which the user process registers a region used by the user process in the TPT, according to the embodiment of the present invention.

FIG. 5 shows the flowchart by which the user process registers a region used by the user process in the TPT, according to the embodiment of the present invention.

In step S1, the user process of node N gives the driver the information about a region to be registered. In step S2, the driver of node N specifies (or pins down, allocates) the region, translates the logical address to the physical address, allocates the local TPT entry i, and stores the information about the region. In step S3, the driver on node N issues the update request to all nodes connected by the network. By the update request, TPT entry i of each node corresponding to the region allocated by the driver of node N is updated.

Figure 6:
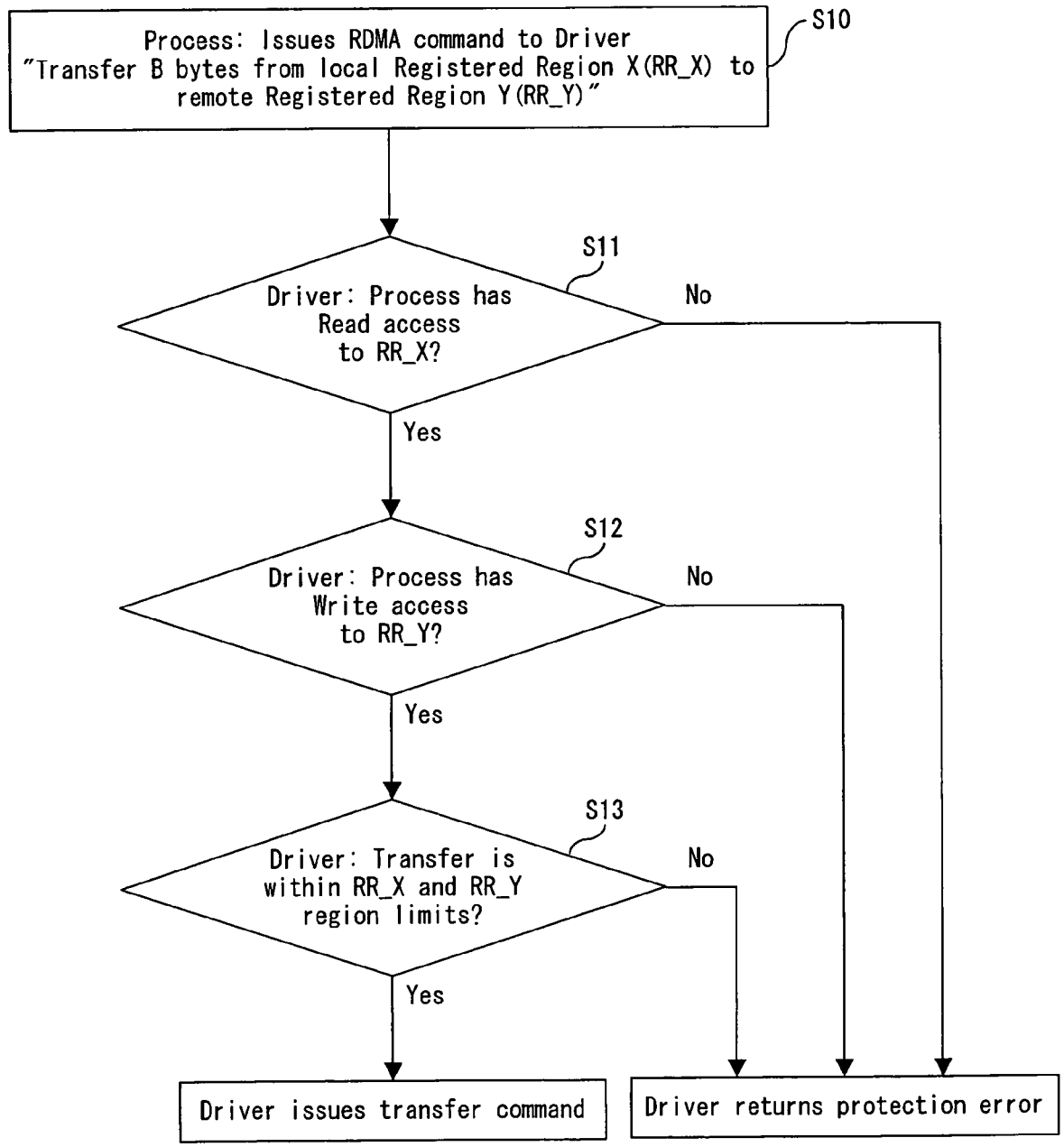
FIG. 6 shows the flowchart by which the user process issues an RDMA transfer command according to the embodiment of the present invention.

FIG. 6 shows the flowchart by which the user process issues RDMA Write transfer command according to the embodiment of the present invention.

In step S10, the user process issues an RDMA command to the driver, which requests to transfer B bytes data (B is a data length in units of byte) from local registered region X (hereinafter, RR_X) to remote registered region Y (hereinafer, RR_Y). In step S11, the driver determines if the user process issued Read access to RR_X. If the determination in step S11 is negative, the driver returns a protection error to the user process. If the determination in step S11 is affirmative, flow goes to step S12. In step S12, the driver determines if the user process issued Write access to RR_Y. If the determination in step S12 is negative, then the driver returns a protection error to the user process. If the determination in step S12 is affirmative, then the flow goes to step S13. In step S13, the driver determines if the length of the transferred data is within the limits of the two regions (that is, RR_X and RR_Y). If the determination in step S13 is negative, the driver returns a protection error to the user process. If the determination in step S13 is affirmative, the driver issues the transfer command to the NIC to have the NIC transfer the data.

FIG. 7 shows the flowchart of host booting according to the embodiment of the present invention.

After the host is booted, the driver initializes the NIC and TPT, enables SEND/RECEIVE function, disables RDMA function and sets the variables, {replied set}, to null in step S15. In step S16, the driver sends to all nodes a BOOTING message. In step S17, the driver waits for response from the other nodes within the specified time. If the timeout occurs in step S17, the flow returns to step S16. When the driver receives a response message (any one of ACK, hardware-generated NACK, BOOTING message) in step S17, the driver identifies the source node of the response message and adds the node identifier to the {replied set} in step S18.

The replied set is, for example, composed of a sequence of 0s and 1s. In step 15, the sequence is set to all 0s. In the sequence, each decimal place is made to correspond to a host. When a response is received by the driver of the self host, the host which sent the response is identified and the 0 in the sequence, located in the corresponding place is set to 1. When the sequence is filled with 1s, that indicates that responses from all hosts have been received.

In step S19, the driver determines if all the nodes are in the {replied set}. If the determination in step S19 is negative, flow returns to step S17. If the determination in step S19 is affirmative, the flow goes to step S20. In step S20, the driver enables the RDMA function, and then sends an $RDMA_{13}$ READY message to all nodes in step S21.

Figure 8:
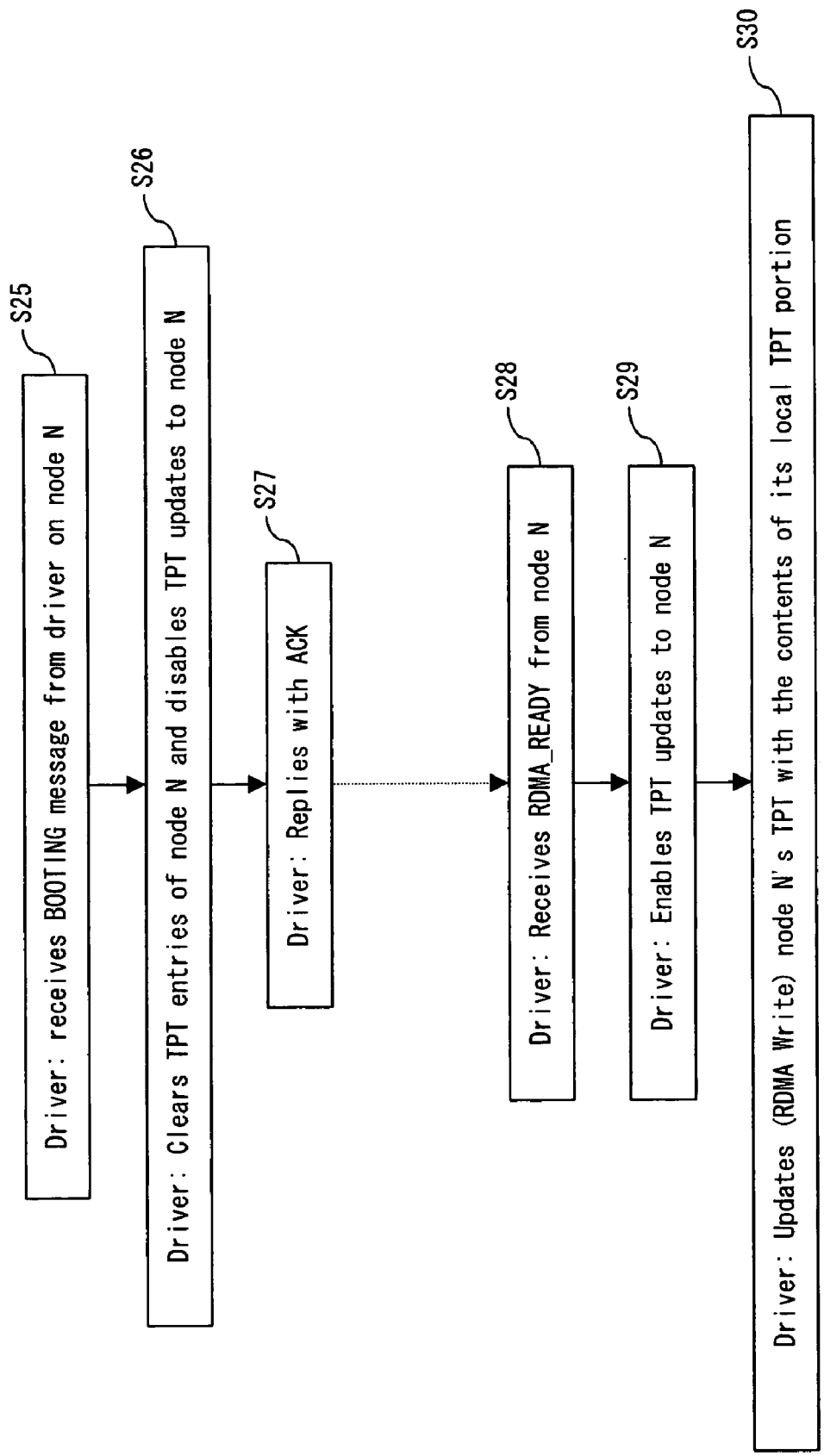
FIG. 8 shows the flowchart by which the node other than the booted node operates.

FIG. 8 shows the flowchart by which a node other than the booted node operates.

In step S25, the driver receives the BOOTING message from the driver of the node N which has booted. In step S26, the driver clears TPT entries of node N and disables TPT updates to node N. In step S27, the driver replies with ACK to the node N. In other cases, the driver of the node other than the node N may be down. In this case, the reply (HW NACK) to the BOOTING message is made by the hardware and is sent back to the node N. Also the node other than the node N may be just booted. In this case, a BOOTING message is sent to the node N and this node operates as the node N.

In any case, the driver receives the RDMA_READY message from node N in step S28. In step S29, the driver enables TPT updates to node N. And in step S30, the driver updates node N's TPT with the contents of its local TPT portion. This update is achieved by, for example, an RDMA Write command.

Although the process flow is explained by referring to only two hosts, the process flow is executed among many hosts.

The present invention provides the apparatus and the method for integrating a host which has an RDMA capable NIC safely into the network without using a user level process.

Further the present invention has been explained by referring to the specific embodiment, but it should be appreciated by a person having ordinary skills in the art that a variety of modifications and changes can be made without departing from the spirit and the scope of the present invention.

What is claimed is:

1. An apparatus in a host in a network of a plurality of hosts, the host and the plurality of hosts having an RDMA function, comprising:
   a unit sending a first message indicating the host boots, to all of the plurality of hosts in the network when the host in the network boots;
   a unit disabling RDMA access from the plurality of hosts to the host
   a unit responding to the first message by sending to the host a second message; and
   a unit sending a third message indicating the host is ready to accept RDMA access from the plurality of hosts, to all of the plurality of hosts after the second messages from all of the plurality of hosts have been received and the RDMA function is enabled wherein the second message is one of acknowledgment, non-acknowledgment and the first message sent from one of the plurality of hosts and the non-acknowledgment is generated by hardware.

2. A method in a host in a network comprising a plurality of hosts, the host and the plurality of hosts having an RDMA function, comprising:
   sending a first message indicating the host boots, to all of the plurality of hosts in the network when the host in the network boots;
   disabling RDMA access from the plurality of hosts to the host;
   responding to the first message by sending to the host a second message; and
   sending a third message indicating the host is ready to accept an RDMA access from the plurality of hosts, to all of the plurality of hosts after the second messages from all of the plurality of hosts has been received and the RDMA function is enabled.

3. The method according to claim 2, which is executed in a driver of the host.

4. The method according to claim 2, further comprising: storing information for making an RDMA access to another host, and wherein when the first message is received the information about the host which sent the first message is cleared from the information stored in the storing step in order to make RDMA access to the host impossible.

5. The method according to claim 4, wherein the information stored in the storing step in the plurality of hosts is updated after the third message is sent to the plurality of hosts.

6. The method according to, claim 2, wherein the second message is one of acknowledgment, non-acknowledgment and the first message sent from one of the plurality of hosts and the non-acknowledgment is generated by a hardware.

7. The method according to claim 2, wherein whether the second message has been received from all of the plurality of hosts or not is tracked and determined by a replied set which comprises a sequence of 0s and 1s.

8. The method according to claim 2, wherein the host is installed with an network interface card which has the RDMA function and another message communicating function, and initialization of the RDMA function and another message communicating function is conducted independently.

9. A computer readable storage medium comprising instructions that when executed cause a plurality of computers to performs a network integrating process comprising:
   sending a first message indicating the host boots, to all of the plurality of hosts in the network when the host in the network boots;
   disabling RDMA access from the plurality of hosts to the host;
   responding to the first message by sending to the host a second message; and
   sending a third message indicating the host is ready to accept an RDMA access from the plurality of hosts, to all of the plurality of hosts after the second messages from all of the plurality of hosts has been received and the RDMA function is enabled.

10. A method of a host in a network of hosts all having an RDMA function, comprising:
    booting, sending an update message updating the network of hosts concerning the booting and disabling RDMA access to the host; and
    awaiting acknowledgment of the update message by all of the network of hosts and sending an update message to the network of hosts indicating readiness to accept RDMA access.

11. A method of a host in a network of hosts all having an RDMA function, comprising:
    awaiting an update from one of the hosts of the network of hosts that the one of the hosts is booting;
    acknowledging the update to the one of the hosts and stopping RDMA accesses to the one of the hosts responsive to the update; and
    awaiting an update from the one of the hosts of the network of hosts that the one of the hosts is available for RDMA access and resuming RDMA accesses to the one of the hosts.

* * * * *

UNITED STATES PATENT AND TRADEMARK OFFICE
CERTIFICATE OF CORRECTION

| | | |
|---|---|---|
| PATENT NO. | : 7,418,487 B2 | |
| APPLICATION NO. | : 10/721506 | |
| DATED | : August 26, 2008 | |
| INVENTOR(S) | : Andreas Savva | |

It is certified that error appears in the above-identified patent and that said Letters Patent is hereby corrected as shown below:

Title Page, Item (57) (Abstract), Line 11, change "$RDMA_{13}$" to --RDMA_--.

Column 8, Line 30, change "to," to --to--.

Column 8, Line 39, change "with an" to --with a--.

Signed and Sealed this

Eleventh Day of November, 2008

JON W. DUDAS
*Director of the United States Patent and Trademark Office*